United States Patent
Fujimura et al.

(10) Patent No.: US 6,198,198 B1
(45) Date of Patent: Mar. 6, 2001

(54) CONTROL CIRCUIT AND METHOD FOR PIEZOELECTRIC TRANSFORMER

(75) Inventors: Takeshi Fujimura; Katsuyuki Ishikawa; Masaaki Toyama, all of Tokyo (JP)

(73) Assignee: Taiheiyo Cement Corporation, Tokyo (JP)

( * ) Notice: Subject to any disclaimer, the term of this patent is extended or adjusted under 35 U.S.C. 154(b) by 0 days.

(21) Appl. No.: 09/355,844

(22) PCT Filed: Feb. 2, 1998

(86) PCT No.: PCT/JP98/00419

§ 371 Date: Aug. 5, 1999

§ 102(e) Date: Aug. 5, 1999

(87) PCT Pub. No.: WO98/35434

PCT Pub. Date: Aug. 13, 1998

(30) Foreign Application Priority Data

| Feb. 6, 1997 | (JP) | ................................................ | 9-023868 |
| Feb. 6, 1997 | (JP) | ................................................ | 9-023869 |
| Sep. 25, 1997 | (JP) | ................................................ | 9-260424 |

(51) Int. Cl.[7] .................................................. H01L 41/08
(52) U.S. Cl. ...................... 310/316.01; 310/317; 310/319
(58) Field of Search ............................... 310/316.01, 358, 310/359, 366; 315/209 R, 209 PZ; 363/97, 133

(56) References Cited

U.S. PATENT DOCUMENTS

| 4,879,528 | * | 11/1989 | Gotanada ..................... 310/316.01 X |
| 5,424,935 | | 6/1995 | Wu .......................................... 363/97 |
| 5,705,879 | * | 1/1998 | Abe et al. .................... 310/316.01 X |
| 5,796,213 | * | 8/1998 | Kawasaki .................... 310/316.01 X |
| 5,894,184 | * | 4/1999 | Furuhashi et al. .............. 310/316.01 |
| 5,942,835 | * | 8/1999 | Furuhashi et al. .............. 310/316.01 |
| 5,962,953 | * | 10/1999 | Sasaki et al. ................ 310/316.01 X |

OTHER PUBLICATIONS

Patent Abstracts of Japan, vol. 11, No. 61, Feb. 25, 1987, Abstract No. 61–220386.

Patent Abstracts of Japan, vol. 17, No. 383, Jul. 19, 1993, Abstract No. 05–064436.

* cited by examiner

Primary Examiner—Mark O. Budd
(74) Attorney, Agent, or Firm—Burns, Doane, Swecker & Mathis, LLP

(57) ABSTRACT

When an input voltage rises, (the amplitude of) a sine-wave voltage for driving a piezoelectric transformer (1) increases, so that a detection voltage (Vti) rectified by a rectifying circuit (9) also increases. An output voltage from an error amplifier (10) for comparing the detection voltage (Vti) with a reference voltage (Vref2) rises. If the output voltage from the error amplifier (10) rises, a voltage-controlled oscillation circuit (11) decreases the duty ratio of an oscillation signal to be output. In a driving circuit (7), as the duty ratio of the oscillation signal decreases, the amplitude of a fundamental wave contained in a rectangular wave to be output decreases to be a small driving voltage to the piezoelectric transformer (1).

19 Claims, 17 Drawing Sheets

CONTROL CIRCUIT AND METHOD FOR PIEZOELECTRIC TRANSFORMER

TECHNICAL FIELD

The present invention relates to a control circuit and method for a piezoelectric transformer suited for use in a driving apparatus for a cold-cathode fluorescent lamp (CCFL).

BACKGROUND ART

Recently, liquid crystal displays are extensively used as display devices of, e.g., portable notebook personal computers. These liquid crystal display devices incorporate a cold-cathode fluorescent lamp as a socalled back light in order to illuminate a liquid crystal display panel from the back. Turning on this cold-cathode fluorescent lamp requires an inverter capable of converting a low DC voltage of a battery or the like into a high AC voltage of 1,000 Vrms or more in an initial lighting state and about 500 Vrms in a steady lighting state. Conventionally, a winding transformer is used as a boosting transformer of this inverter. In recent years, however, a piezoelectric transformer which performs electric conversion via mechanical energy and thereby performs boosting is beginning to be used. This piezoelectric transformer has a generally unpreferable characteristic, i.e., largely changes its boosting ratio in accordance with the magnitude of an output load (load resistance). On the other hand, this dependence upon a load resistance is suited to the characteristics of an inverter power supply for a cold-cathode fluorescent lamp. Accordingly, a piezoelectric transformer has attracted attention as a small-sized, high-voltage power supply meeting the demands for a low profile and a high efficiency of a liquid crystal display. An example of a control circuit for this piezoelectric transformer will be described below with reference to FIG. 1.

FIG. 1 is a block diagram of a piezoelectric transformer control circuit as the prior art.

In FIG. 1, reference numeral 101 denotes a piezoelectric transformer; 102, a load such as a cold-cathode fluorescent lamp connected to the output terminal of the piezoelectric transformer 101; 103, a detecting resistor Rdet for detecting a current flowing in the load; 104, a rectifying circuit for converting an AC voltage generated in the detecting resistor 103 into a DC voltage; 105, an error amplifier for comparing a voltage (to be referred to as a load current detection voltage hereinafter) Vri rectified by the rectifying circuit 104 with a reference voltage Vref and amplifying the difference as a comparison result; 106, a voltage-controlled oscillation circuit for outputting a signal having an oscillation frequency (to be referred to as an oscillation signal hereinafter) in accordance with the output voltage from the error amplifier 105; and 107, a driving circuit for driving the piezoelectric transformer 101 on the basis of the oscillation signal from the voltage-controlled oscillation circuit 106, and an input voltage Vi (DC current).

FIG. 2 is a view showing an example of the internal arrangement of the driving circuit as the prior art.

In FIG. 2, reference numeral 107a denotes a transistor such as a FET (Field Effect Transistor) for generating an AC voltage by switching the input voltage Vi in accordance with an oscillation signal from the voltage-controlled oscillation circuit 106; and 107b, a winding transformer for applying the AC voltage to the piezoelectric transformer 101. Since the winding transformer 107b has a filter effect by a secondary inductive component and a capacitive component of the piezoelectric transformer 101, a rectangular-wave voltage generated by switching of the transistor 107a is changed into a sine wave on the secondary side of the winding transformer 107b to be applied to the piezoelectric transformer. This sine-wave voltage drives the piezoelectric transformer 101 to generate a high AC voltage at the output terminal of the piezoelectric transformer 101.

The operation of the control circuit with the above arrangement will be described below with reference to FIGS. 3A and 3B.

FIGS. 3A and 3B are graphs for explaining an example of frequency characteristics for an output voltage from the piezoelectric transformer and a load current.

As shown in FIG. 3A, the piezoelectric transformer 101 has a hilly resonance frequency characteristic whose peak is the resonance frequency of the piezoelectric transformer 101. It is generally known that a current flowing in the load 102 due to the output voltage from the piezoelectric transformer 101 also has a similar hilly characteristic. In FIG. 3B, this load current is represented by the load current detection voltage Vri (characteristic curve A). Control using a right-side (falling) portion in this characteristic will be described below. When the power supply of this control circuit is turned on, the voltage-controlled oscillation circuit 106 starts oscillating at an initial frequency fa. Since no current flows in the load 102 at that time, the voltage generated in the detecting resistor 103 is zero. Accordingly, the error amplifier 105 outputs a negative voltage, as a result of comparison of the load current detection voltage Vri with the reference voltage Vref, to the voltage-controlled oscillation circuit 106. In accordance with this voltage, the voltage-controlled oscillation circuit 106 shifts the oscillation frequency of an oscillation signal to a lower frequency. Therefore, as the frequency is shifted to a lower frequency, the output voltage from the piezoelectric transformer 101 rises, and the load current (load current detection voltage Vri) also increases. When the load current (load current detection voltage Vri) and the reference voltage Vref become equal to each other, the frequency stabilizes (fb). In the control circuit which operates in this manner, even if the resonance frequency of the piezoelectric transformer 101 changes due to a temperature change or a change with time, the oscillation frequency of the voltage-controlled oscillation circuit 106 shifts in response to the change to always hold the load current substantially constant.

In the control circuit shown in FIG. 1, therefore, frequency control is so performed that the load current detection voltage Vri becomes equal to the reference voltage Vref, and the load current is held at a predetermined value by this frequency control.

However, if the input voltage Vi increases in the piezoelectric transformer control circuit as the prior art, a voltage for driving the piezoelectric transformer 101 increases to raise an output voltage from the piezoelectric transformer 101 (characteristic curve B in FIG. 3B). Since the rise in output voltage increases a current in the load connected to the output terminal of the piezoelectric transformer 101, the load current detection voltage Vri becomes higher than the reference voltage Vref, resulting in a shift of the frequency of the oscillation signal to a higher frequency fc. To the contrary, if the input voltage falls, the load current decreases to shift the frequency of the oscillation signal to a lower frequency. In general, the input/output conversion efficiency of the piezoelectric transformer is the highest when the piezoelectric transformer is driven at a frequency around the resonance frequency of the piezoelectric transformer, and lowers as the frequency shifts to a higher frequency.

Therefore, although the control circuit has a desirable function of holding the load current at a predetermined value even if the input voltage Vi changes, the driving frequency of the piezoelectric transformer varies owing to variations in input voltage Vi, resulting in a low conversion efficiency.

DISCLOSURE OF INVENTION

It is an object of the present invention to provide a control circuit and method for a piezoelectric transformer in which a load current can be controlled to a predetermined value regardless of changes in input voltage to drive the piezoelectric transformer at a high efficiency.

To achieve the above object, a piezoelectric transformer control circuit of the present invention has the following arrangements.

That is, a piezoelectric transformer control circuit for switching an input DC voltage by a driving circuit to generate an AC voltage, and driving a piezoelectric transformer by the AC voltage to obtain a high AC voltage, comprises driving voltage detecting means for detecting a magnitude of a driving voltage to the piezoelectric transformer, driving voltage error output means for comparing an output from the driving voltage detecting means with a first predetermined value and outputting a result, and oscillating means for outputting an oscillation signal for switching the input voltage in accordance with the output from the driving voltage error output means. The oscillation signal is preferably a rectangular wave, and the oscillating means preferably adjusts a duty ratio of the rectangular wave.

Preferably, the piezoelectric transformer control circuit further comprises load current detecting means for detecting a magnitude of a current flowing in a load connected to the piezoelectric transformer, and load current error output means for comparing an output from the load current detecting means with a second predetermined value and outputting a result, wherein the oscillating means comprises frequency adjusting means for adjusting a frequency of the oscillation signal in accordance with the output from the load current error output means, and duty ratio adjusting means for adjusting a duty ratio of the oscillation signal in accordance with the output from the driving voltage error output means.

With this arrangement, the load current is controlled to the second predetermined value, and the driving voltage to the piezoelectric transformer is controlled to the first predetermined value regardless of changes in input voltage.

Also, to achieve the above object, a piezoelectric transformer control method of the present invention has the following arrangements.

That is, a piezoelectric transformer control method of switching an input DC voltage to generate an AC voltage, and driving a piezoelectric transformer by the AC voltage to obtain a high AC voltage, comprises the driving voltage detection step of detecting a magnitude of a driving voltage to the piezoelectric transformer, the first comparison step of comparing the detected driving voltage with a first predetermined value, and the oscillation step of generating an oscillation signal for switching the input voltage in accordance with a comparison result. With this method, the driving voltage is controlled to the first predetermined value, regardless of changes in input voltage.

Preferably, the piezoelectric transformer control method further comprises the load current detection step of detecting a magnitude of a current flowing in a load connected to the piezoelectric transformer, and the second comparison step of comparing the detected load current with a second predetermined value, wherein the oscillation step comprises the frequency adjustment step of adjusting a frequency of the oscillation signal in accordance with the comparison result in the first comparison step, and the duty ratio adjustment step of adjusting a duty ratio of the oscillation signal in accordance with a comparison result in the second comparison step. With this method, the load current is controlled to the second predetermined value, and the driving voltage to the piezoelectric transformer is controlled to the first predetermined value regardless of changes in input voltage.

Other features and advantages of the present invention will be apparent from the following description taken in conjunction with the accompanying drawings, in which like reference characters designate the same or similar parts throughout the figures thereof.

BEST MODE FOR CARRYING OUT THE INVENTION

An embodiment of a piezoelectric transformer control circuit according to the present invention will be described below with reference to the accompanying drawings.

[First Embodiment]

Figure 4:
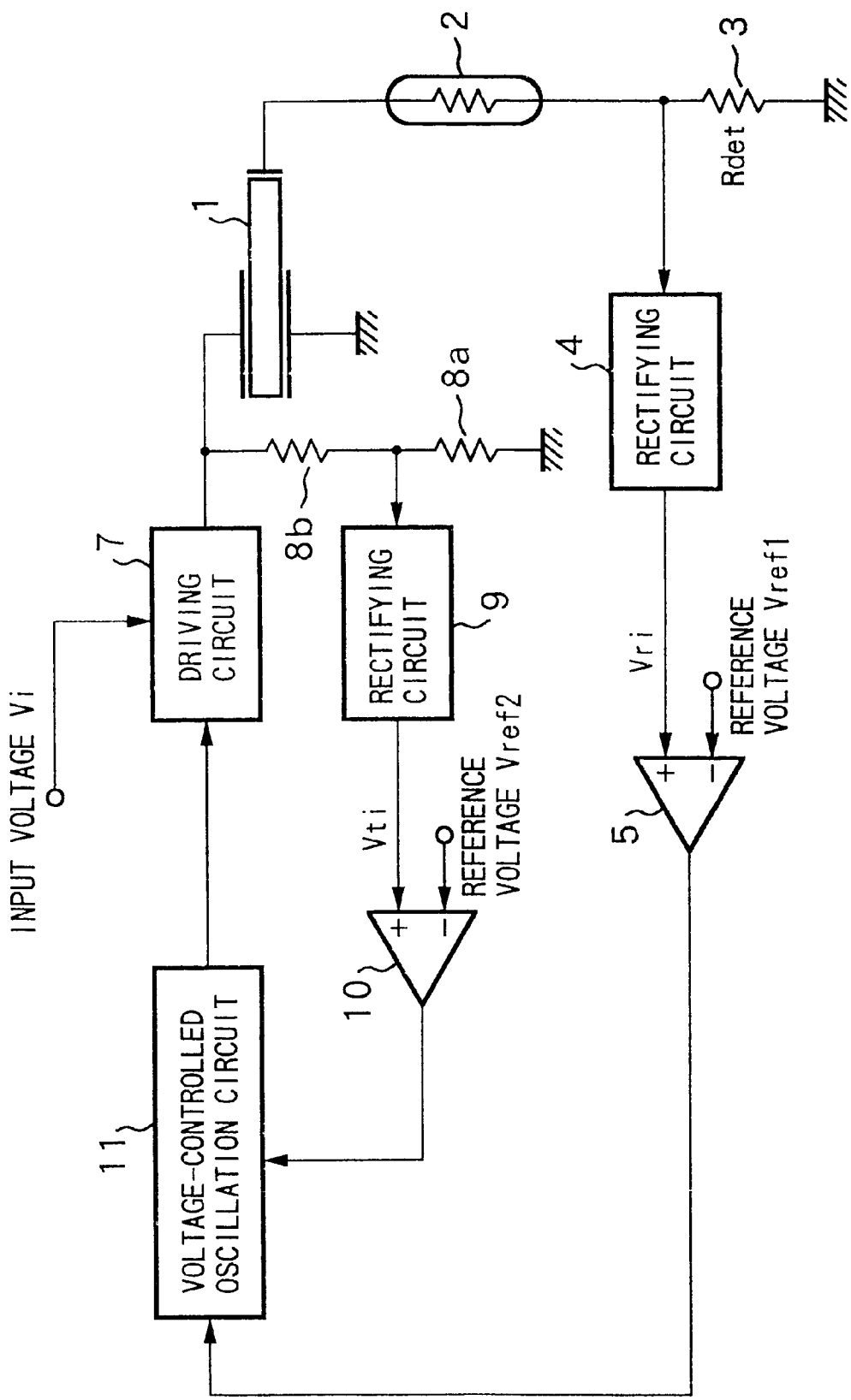
FIG. 4 is a block diagram of a piezoelectric transformer control circuit as the first embodiment of the present invention.

FIG. 4 is a block diagram of a piezoelectric transformer control circuit as the first embodiment of the present invention.

Figure 2:
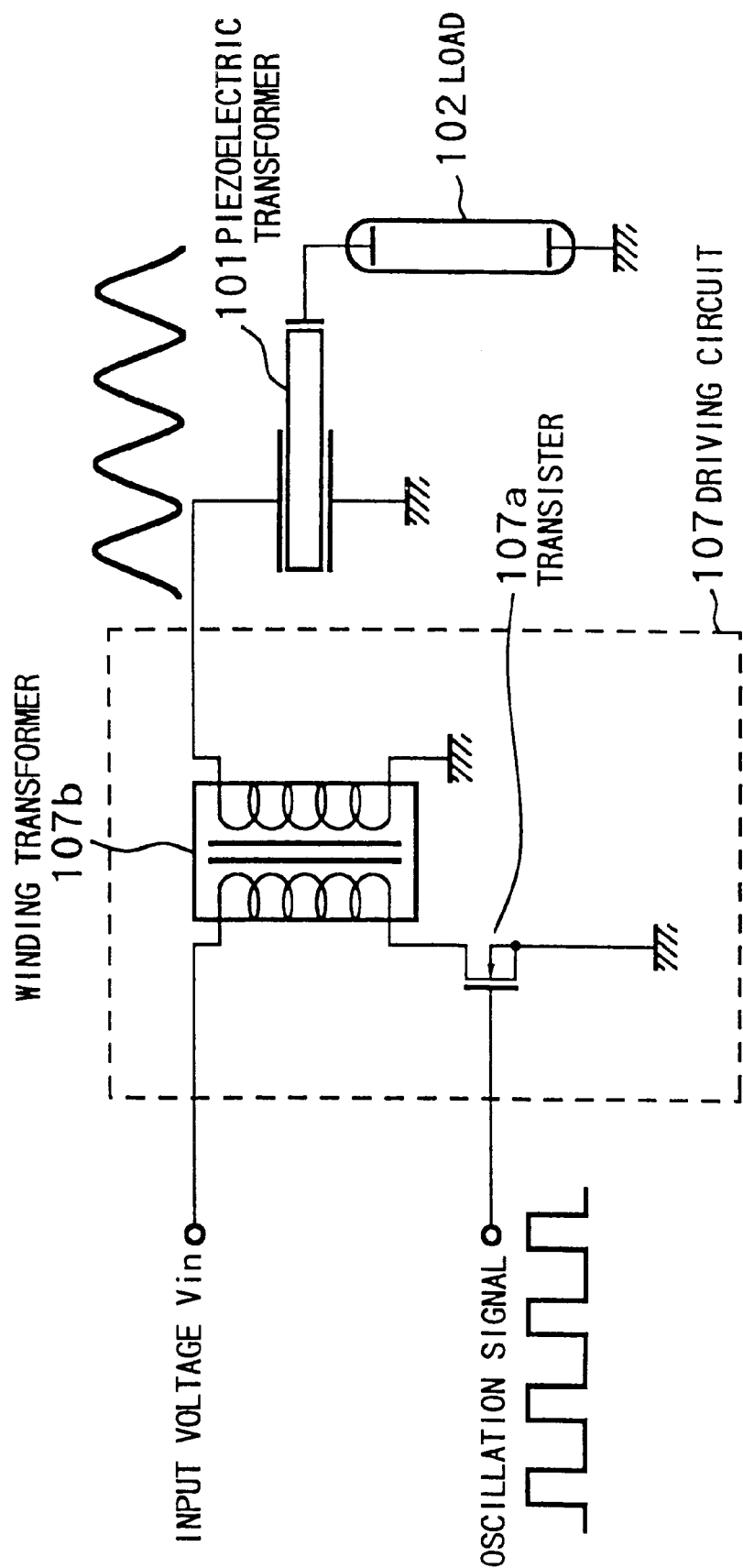
FIG. 2 is a view showing an example of the internal arrangement of a driving circuit as the prior art.
Figure 3A:
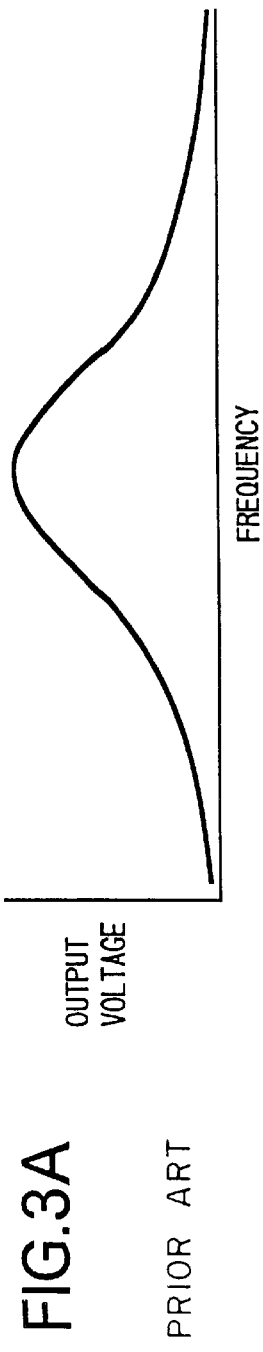
FIGS. 3A and 3B are graphs for explaining an example of frequency characteristics for an output voltage from the piezoelectric transformer and a load current.
Figure 3B:
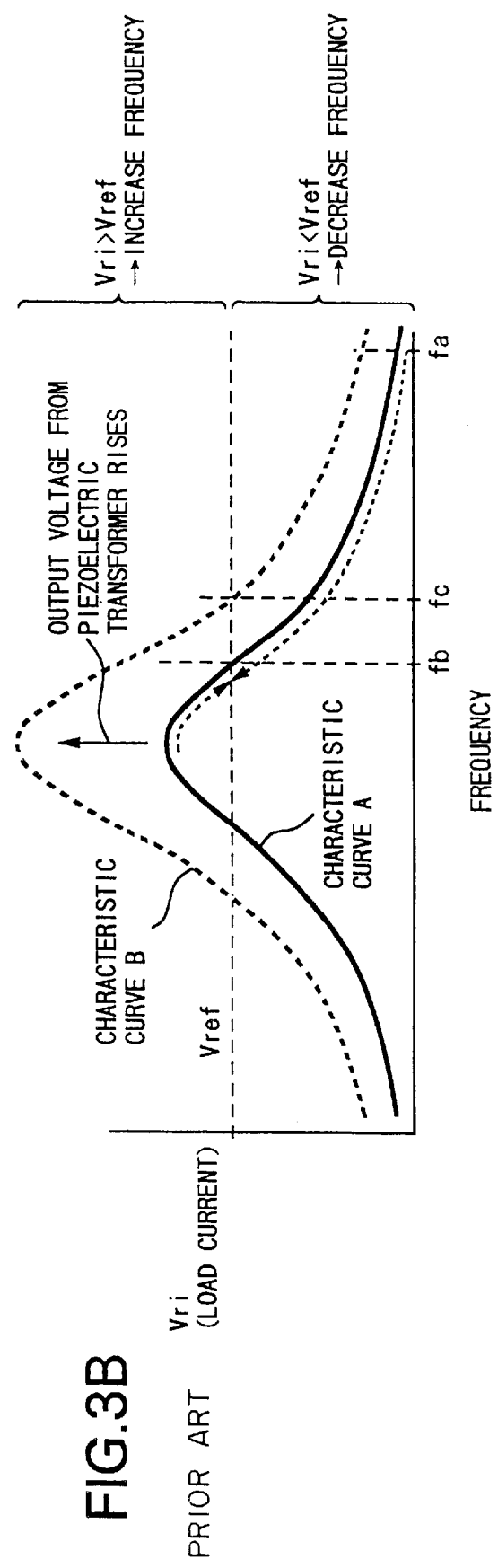

In FIG. 4, reference numeral 1 denotes a piezoelectric transformer; 2, a load such as a cold-cathode fluorescent lamp connected to the output terminal of the piezoelectric transformer 1; 3, a detecting resistor Rdet for detecting a current flowing in the load; 4, a rectifying circuit for converting an AC voltage generated in the detecting resistor 3 into a DC voltage; 5, an error amplifier for comparing an output voltage (load current detection voltage) Vri from the rectifying circuit 4 with a reference voltage Vref1 and amplifying the difference; 7, a driving circuit having the same arrangement as that in FIG. 2 described above; 8a and 8b, detecting resistors for detecting the magnitude of a driving voltage to the piezoelectric transformer 1; 9, a rectifying circuit for converting an AC voltage generated in the detecting resistor 8a into a DC voltage; 10, an error amplifier for comparing an output voltage Vti from the rectifying circuit 9 with a reference voltage Vref2 and amplifying the difference; and 11, a voltage-controlled oscillation circuit for outputting an oscillation signal having a frequency corresponding to an output voltage from the error amplifier 5, and a duty ratio corresponding to an output voltage from the error amplifier 10.

The operation of the voltage-controlled oscillation circuit 11 in the control circuit of FIG. 4 will be explained below.

Figure 5:
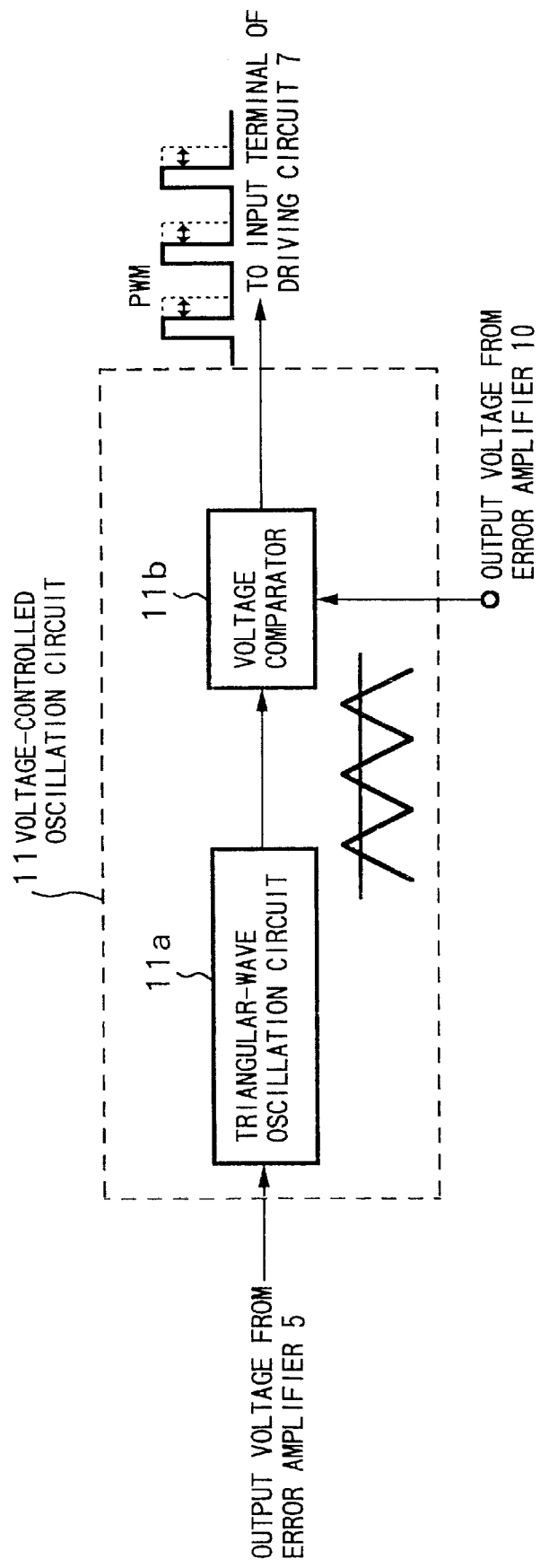
FIG. 5 is a view showing the internal arrangement of a voltage-controlled oscillation circuit as the first embodiment of the present invention.

FIG. 5 is a view showing the internal arrangement of the voltage-controlled oscillation circuit as the first embodiment of the present invention.

In FIG. 5, the voltage-controlled oscillation circuit 11 comprises a triangular-wave oscillation circuit 11a and a voltage comparator 11b. The triangular-wave oscillation circuit 11a outputs, as an oscillation signal, a triangular wave having a frequency corresponding to an output voltage from the error amplifier 5. The voltage comparator 11b performs so-called PWM (Pulse Width Modulation) on the basis of the comparison result of the triangular wave output from the triangular-wave oscillation circuit 11a and an output voltage from the error amplifier 10, and outputs a rectangular wave. As the voltage of the error amplifier 10 rises, an oscillation signal having a smaller duty ratio is output to the driving circuit 7.

Assume that, in the control circuit of FIG. 4, a DC voltage of 5 V is applied as an input voltage Vi, the output voltage Vti from the rectifying circuit 9 serving as a driving voltage to the piezoelectric transformer 1 is equal to the reference voltage Vref2 in this state, and as a result an oscillation signal with a duty ratio of 40% is output from the voltage-controlled oscillation circuit 11. In this case, the driving circuit 7 drives the piezoelectric transformer 1 on the basis of the oscillation signal with a duty ratio of 40%.

Assume that the input voltage Vi rises to 7 V in this state. The rise in input voltage Vi increases (the amplitude of) a sine-wave voltage for driving the piezoelectric transformer 1, and also increases the detection voltage Vti obtained by the driving voltage detecting resistors 8a and 8b, which are connected to the input terminal of the piezoelectric transformer 1, and the rectifying circuit 9. Then, an output voltage from the error amplifier 10 rises, and the voltage-controlled oscillation circuit 11 operates to decrease the duty ratio of the oscillation signal. In the driving circuit 7, as the duty ratio of the oscillation signal decreases, the duty ratio of a rectangular-wave voltage generated by switching of the transistor 107a also decreases. Consequently, the amplitude of a sine wave obtained on the secondary side of the winding transformer 107b also decreases. That is, the voltage-controlled oscillation circuit 11 operates to decrease the driving voltage to the piezoelectric transformer 1. To the contrary, when the input voltage Vi falls from 5 V, the duty ratio is increased to increase the driving voltage to the piezoelectric transformer 1. By performing this control, a load current and a driving voltage can be respectively controlled to predetermined values even when the input voltage Vi changes. Therefore, a predetermined driving voltage that can drive the piezoelectric transformer 1 at a high efficiency can always be obtained.

<Modification of First Embodiment>

Figure 6:
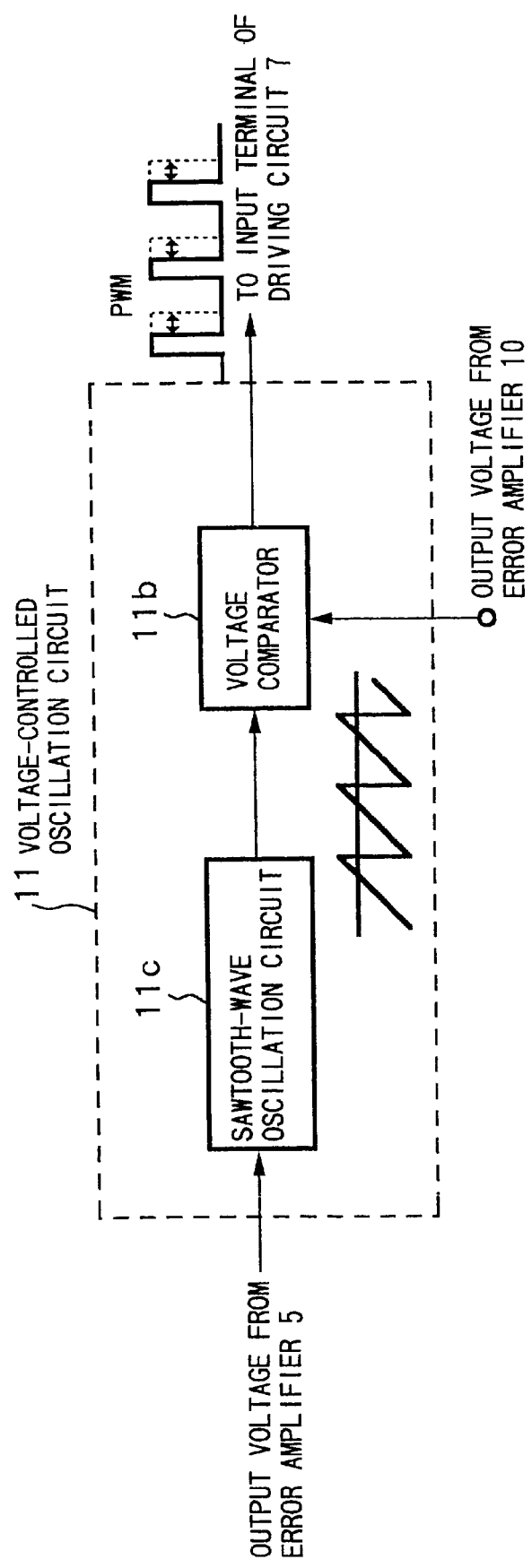
FIG. 6 is a view showing the internal arrangement of a voltage-controlled oscillation circuit as a modification of the first embodiment of the present invention.

FIG. 6 is a view showing the internal arrangement of the voltage-controlled oscillation circuit as a modification of the first embodiment of the present invention.

In FIG. 6, the voltage-controlled oscillation circuit comprises a sawtooth-wave oscillation circuit 11c for outputting a sawtooth wave having a frequency corresponding to an output voltage from the error amplifier 5, and a voltage comparator 11b for performing so-called PWM (Pulse Width Modulation) on the basis of the comparison result of the sawtooth wave output from the sawtooth-wave oscillation circuit 11c and an output voltage from the error amplifier 10 and outputting a rectangular wave. The operations of the voltage-controlled oscillation circuit and a piezoelectric transformer having this circuit are substantially the same as those of the voltage-controlled oscillation circuit 11 shown in FIG. 4, and a description thereof will be omitted.

[Second Embodiment]

Figure 7:
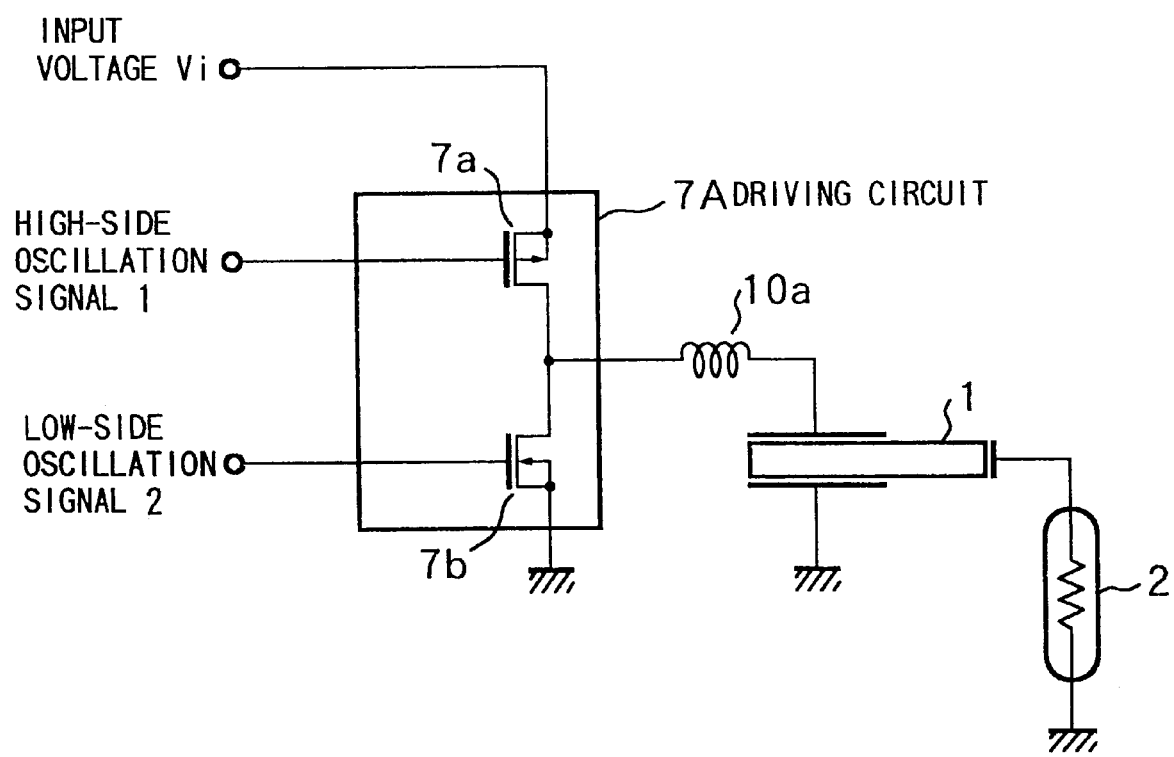
FIG. 7 is a view showing the internal arrangement of a half-bridge type driving circuit as the second embodiment of the present invention.
Figure 8:
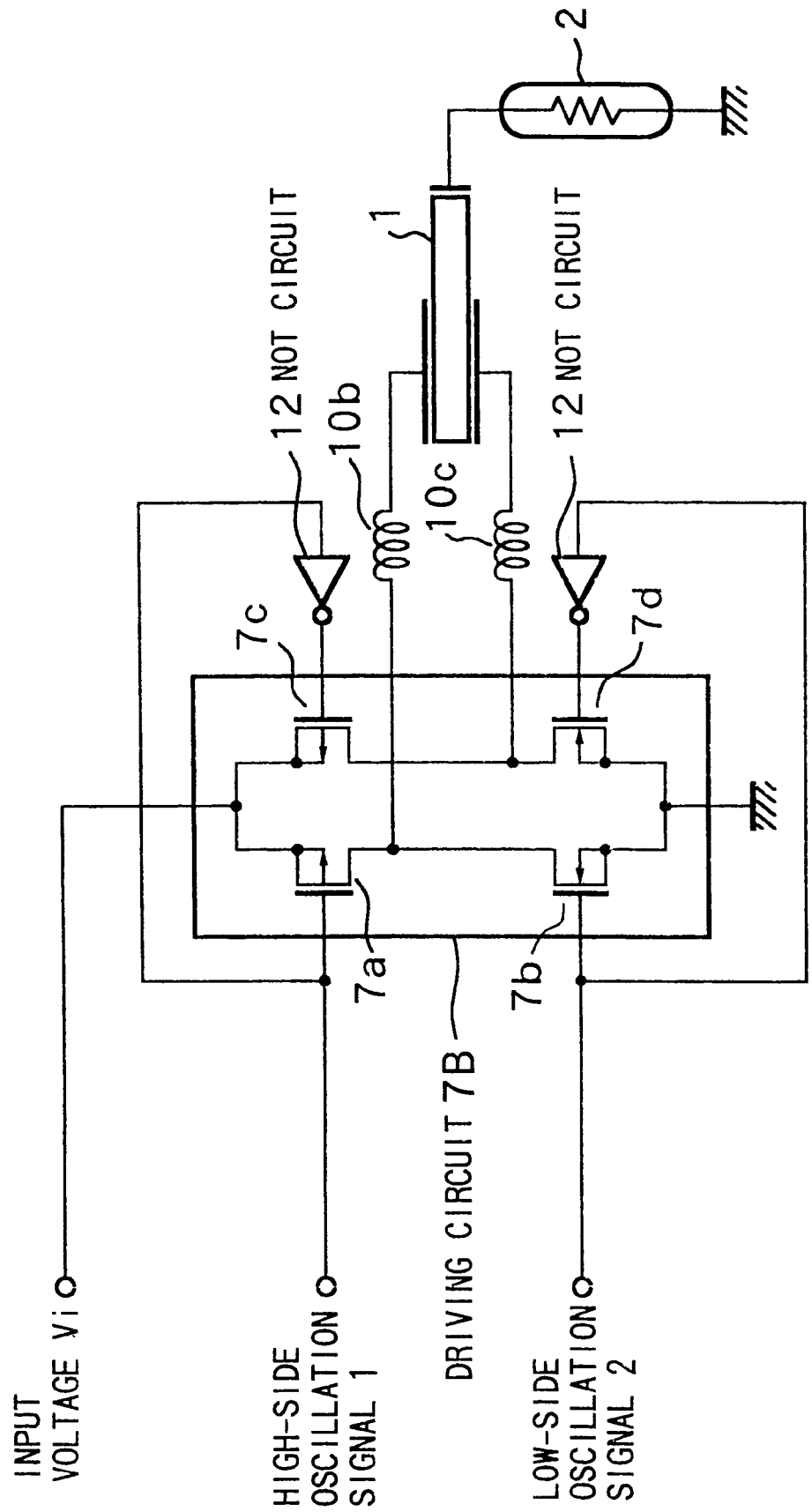
FIG. 8 is a view showing the internal arrangement of a full-bridge type driving circuit as the second embodiment of the present invention.

The case in which a driving circuit 7 is of a so-called half-bridge or full-bridge type using a switching transistor will be described as the second embodiment. Since a half-bridge or full-bridge circuit arrangement is general, a detailed description thereof will be omitted. FIGS. 7 and 8 schematically show the driving circuit.

FIG. 7 is a view showing the internal arrangement of the half-bridge type driving circuit as the second embodiment of the present invention.

In a driving circuit 7A, transistors 7a and 7b such as FETs (Field Effect Transistors; in the second embodiment, the transistors 7a and 7b are of the p- and n-type, respectively) are constituted into a half-bridge form, as shown in FIG. 7. Two types of oscillation signals are respectively input from a voltage-controlled oscillation circuit 11A (to be described later) to high and low sides to alternately turn on/off the transistors 7a and 7b. By the switching operation of the driving circuit 7A, the input voltage Vi is converted into a rectangular wave having a peak value Vi corresponding to an oscillation signal. A harmonic component is removed from this rectangular wave by a choke coil 10a, and the obtained wave serves as a sine-wave driving voltage to a piezoelectric transformer 1.

FIG. 8 is a view showing the internal arrangement of a full-bridge type driving circuit as the second embodiment of the present invention.

In a driving circuit 7B, transistors 7a to 7d such as FETs (Field Effect Transistors; in the second embodiment, the transistors 7a and 7c are of the p-type, and the transistors 7b and 7d are of the n-type) are constituted into a full-bridge form, as shown in FIG. 8. Reference numeral 12 denotes a NOT circuit for reversing an oscillation signal; and 10b and 10c, choke coils. Switching of the full-bridge type driving circuit 7B is performed by respectively inputting two types of oscillation signals from the voltage-controlled oscillation circuit 11A (to be described later) to high and low sides and alternately turning on/off the transistors 7a and 7c and the transistors 7b and 7d. The input voltage Vi is converted into a rectangular wave having a peak value Vi corresponding to an oscillation signal by the switching operation of the driving circuit 7B, and this rectangular wave is converted into a sine wave by choke coils 10b and 10c. This is the same as in the half-bridge type driving circuit though the driving voltage of the full-bridge type driving circuit is naturally twice the driving voltage of the half-bridge type driving circuit owing to the full-bridge circuit arrangement.

An oscillation signal to be input to the high- and low-side input terminals of the bridge circuit will be explained with reference to the experimental results (FIGS. 12A to 14B) of the present inventors.

<Case Wherein Duty Ratios of High- and Low-Side Oscillation Signals Are Controlled>

Figure 12A:
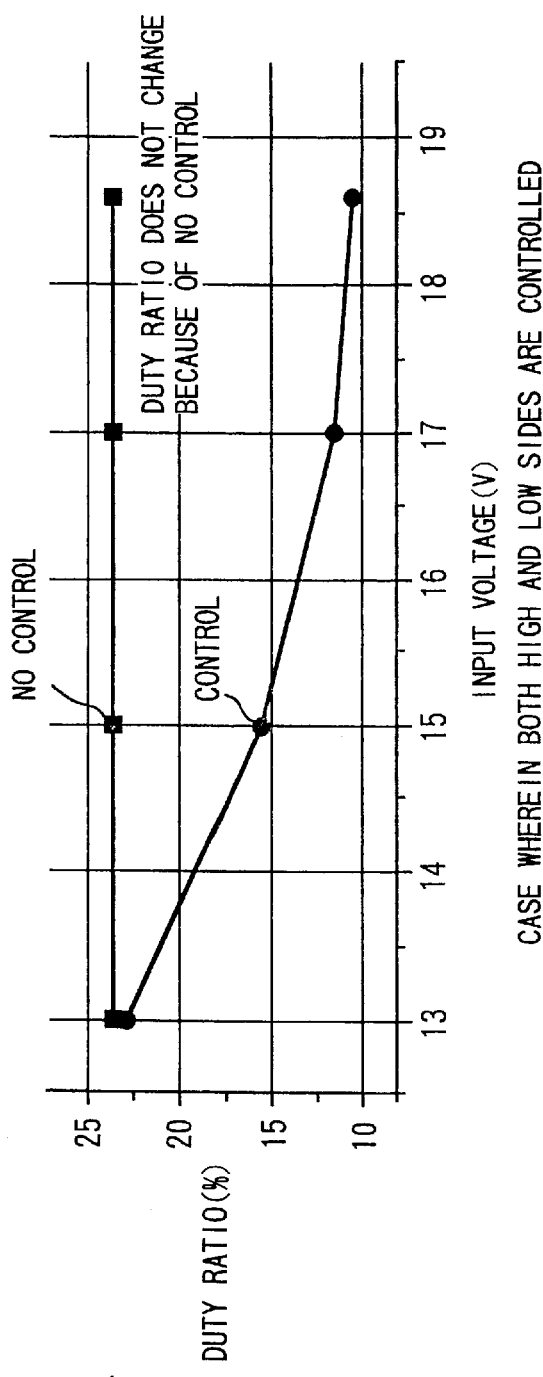
FIGS. 12A and 12B are graphs for explaining experimental results obtained when the duty ratios of high- and low-side oscillation signals are controlled.
Figure 12B:
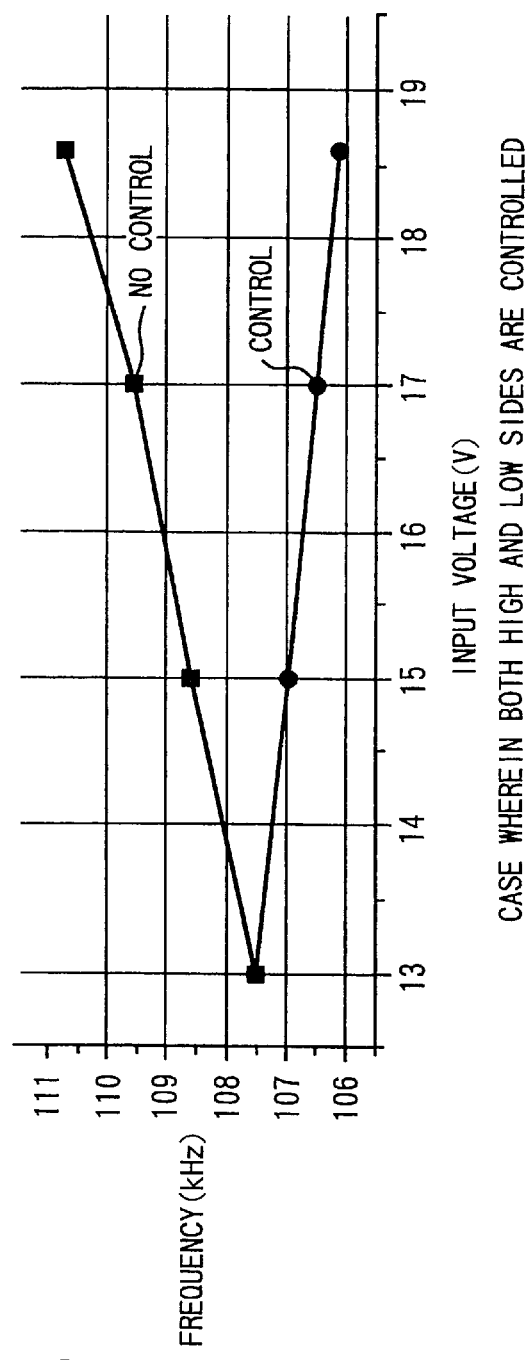

FIGS. 12A and 12B show circuit characteristics obtained when the duty ratios of high- and low-side oscillation signals are controlled, i.e., when a common oscillation signal having undergone pulse width modulation is input to the high and low sides from the voltage-controlled oscillation circuit 11 in FIG. 5 described above.

Figure 1:
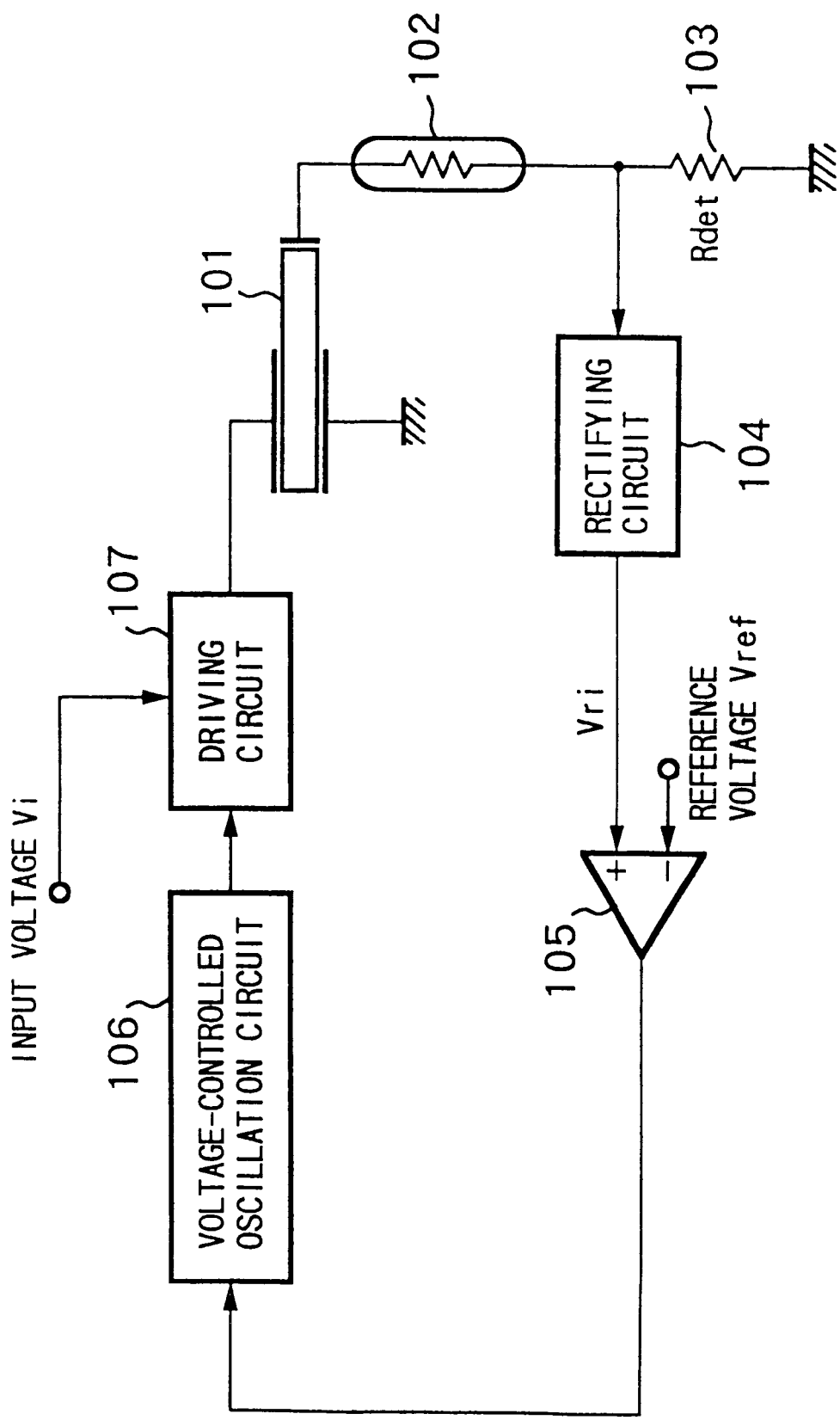
FIG. 1 is a block diagram of a piezoelectric transformer control circuit as the prior art.

As shown in FIGS. 12A and 12B, when the duty ratio is not controlled ("no control": corresponding to the voltage-controlled oscillation circuit 106 in FIG. 1), the frequency of an oscillation signal output from the voltage-controlled oscillation circuit 11 increases as the input voltage Vi to the driving circuit 7 rises. When the duty ratio is controlled by pulse width modulation ("control"), the frequency of the oscillation signal output from the voltage-controlled oscillation circuit 11 decreases as the input voltage Vi to the driving circuit 7 rises. This is because the detected driving voltage to the piezoelectric transformer 1 is different from a voltage (energy) actually input to the piezoelectric transformer, and the actually input voltage does not increase by the detected increase amount of the driving voltage, so that the driving voltage decreases.

<Case Wherein Duty Ratio of Only High-Side Oscillation Signal Is Controlled>

Figure 13A:
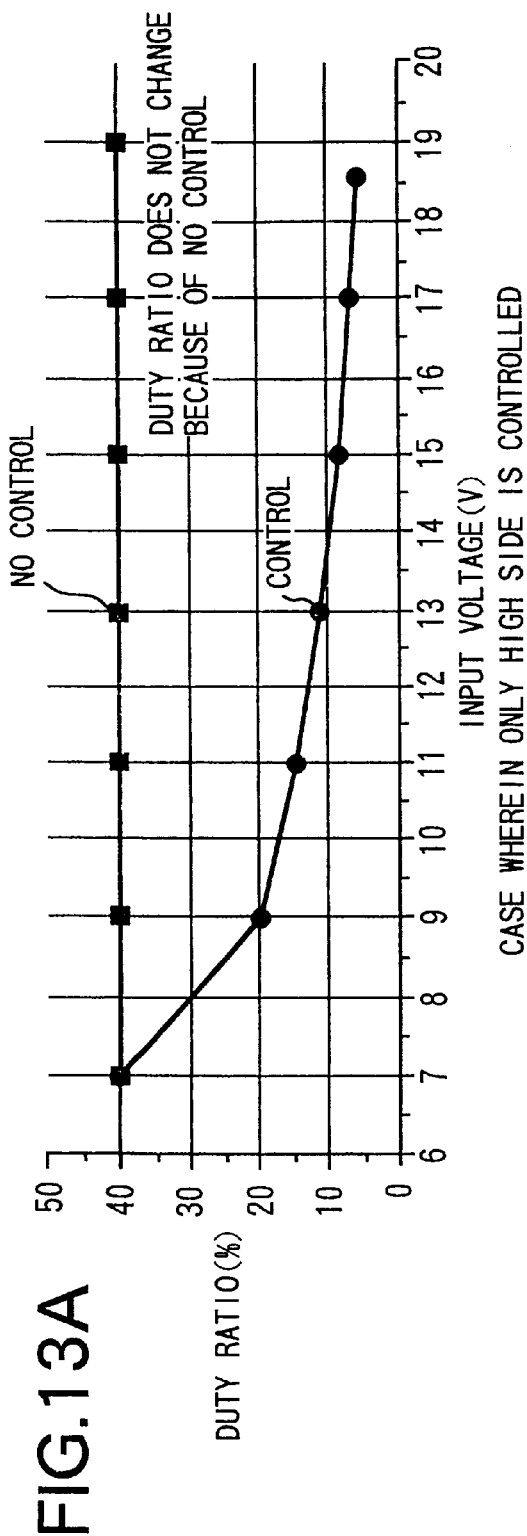
FIGS. 13A and 13B are graphs for explaining experimental results obtained when the duty ratio of only the high-side oscillation signal is controlled.
Figure 13B:
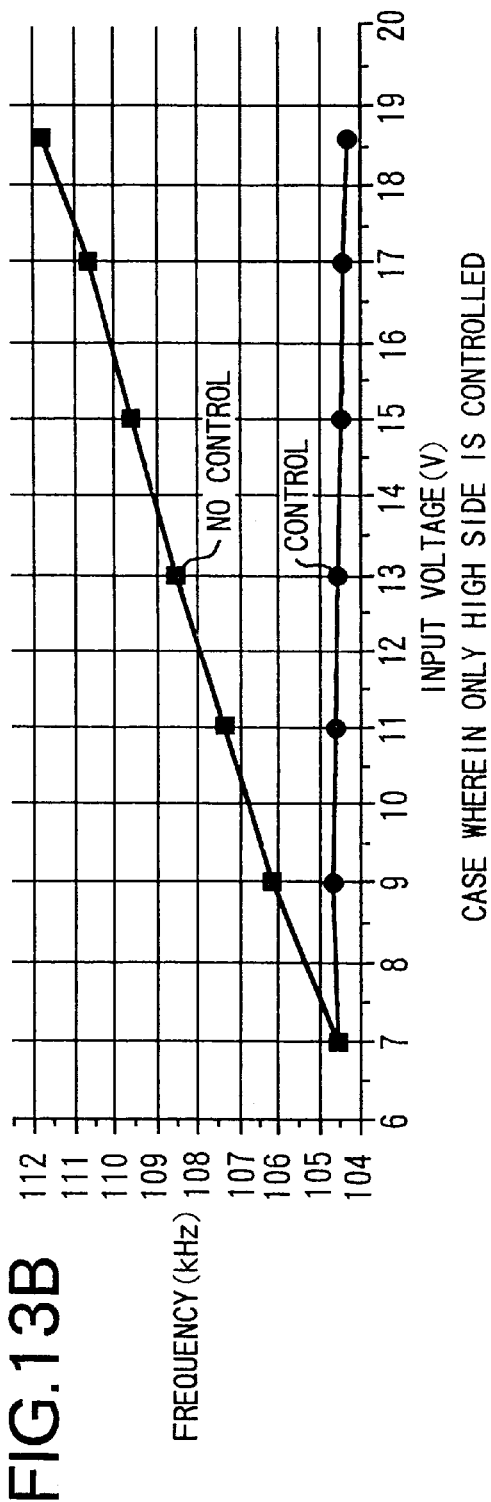

FIGS. 13A and 13B show circuit characteristics obtained when the duty ratio of only a high-side oscillation signal is controlled.

As shown in FIGS. 13A and 13B, when the duty ratio is controlled by pulse width modulation ("control"), the duty ratio decreases as the input voltage Vi to the driving circuit 7 increases, substantially eliminating frequency variations.

<Case Wherein Duty Ratio of Only Low-Side Oscillation Signal Is Controlled>

The case in which the duty ratio of only a low-side oscillation signal is controlled will be explained with reference to FIGS. 14A and 14B.

Figure 14A:
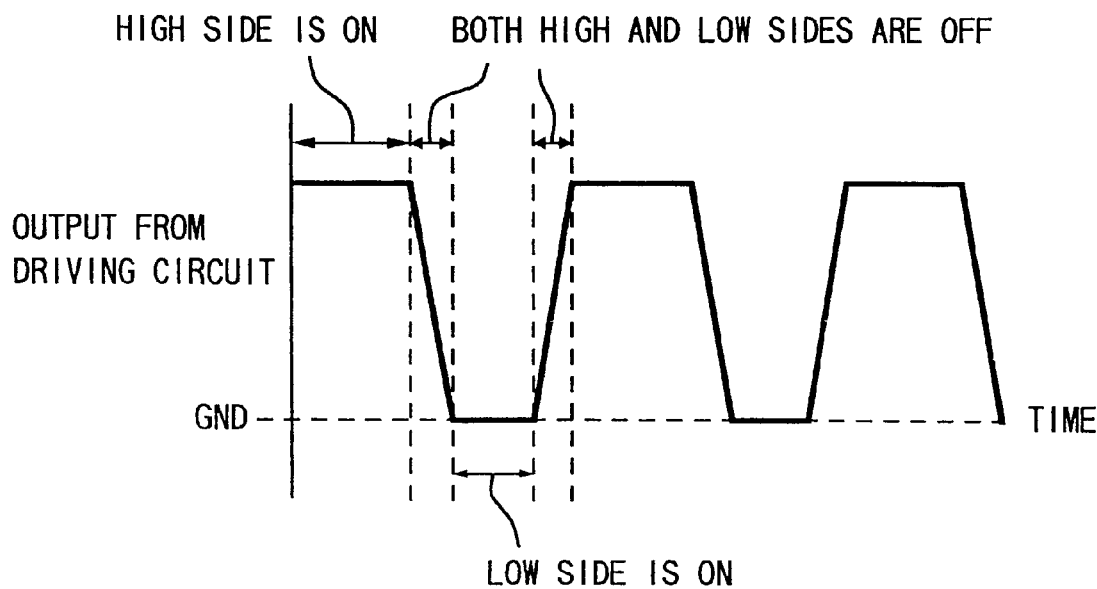
FIGS. 14A and 14B are graphs for explaining experimental results obtained when the duty ratio of only the low-side oscillation signal is controlled.
Figure 14B:
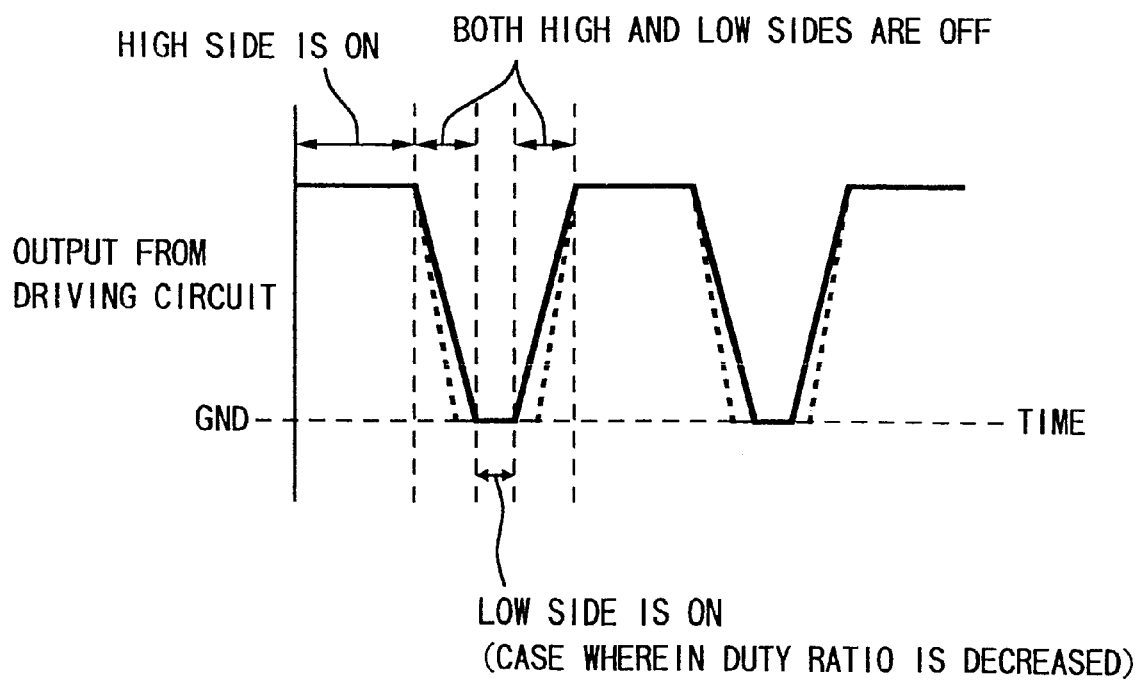

As shown in FIGS. 14A and 14B, when the low-side duty ratio decreases, a period in which an output from the driving circuit is at a ground (GND) potential shortens, so that the detected driving voltage to the piezoelectric transformer 1 rises, failing preferable control.

From the above results, when the half-bridge or full-bridge type driving circuit (FIG. 7 or 8) is employed, an arrangement in which the duty ratio of only a high-side oscillation signal is controlled is adopted. A voltage-controlled oscillation circuit in this case will be described below.

Figure 9:
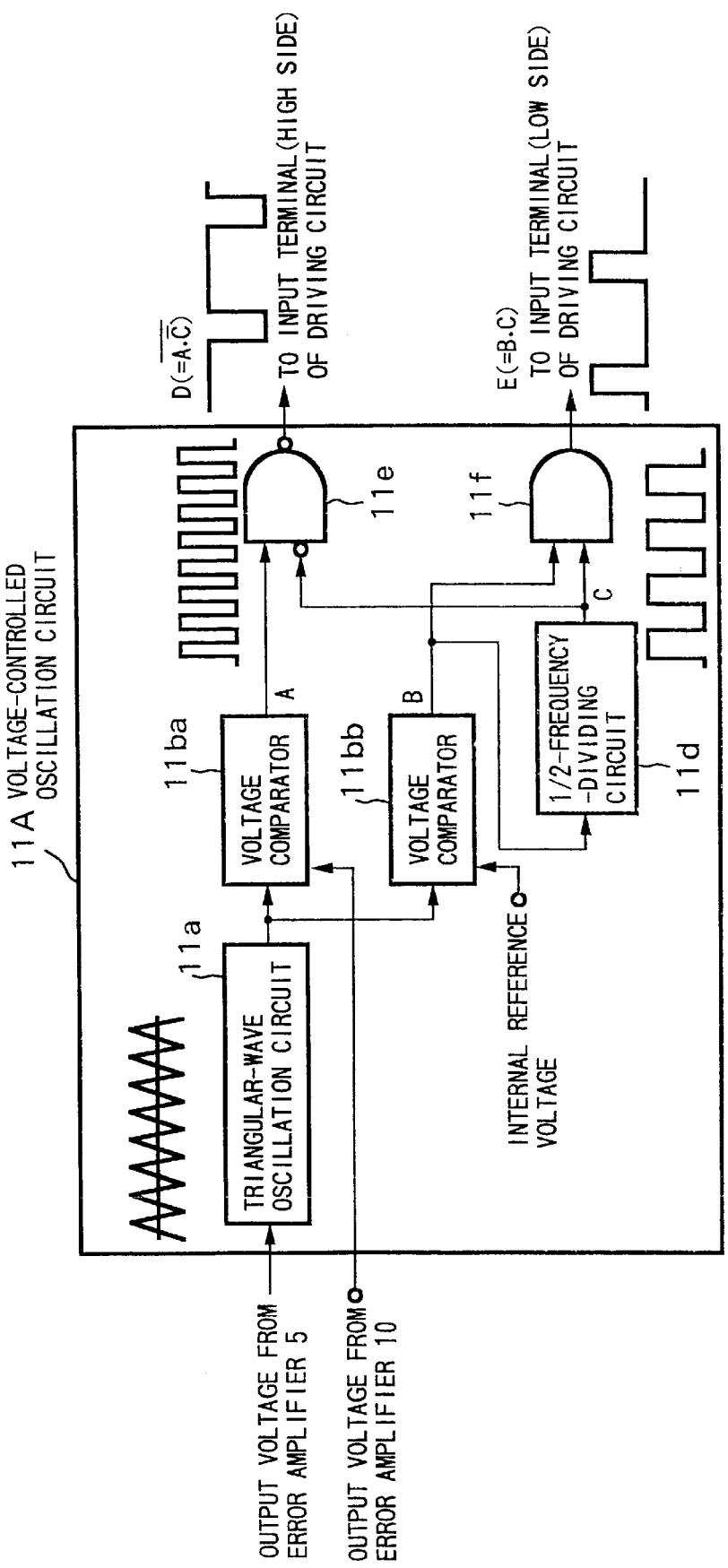
FIG. 9 is a view showing the internal arrangement of a voltage-controlled oscillation circuit as the second embodiment of the present invention.

FIG. 9 is a view showing the internal arrangement of the voltage-controlled oscillation circuit as the second embodiment of the present invention.

Figure 10:
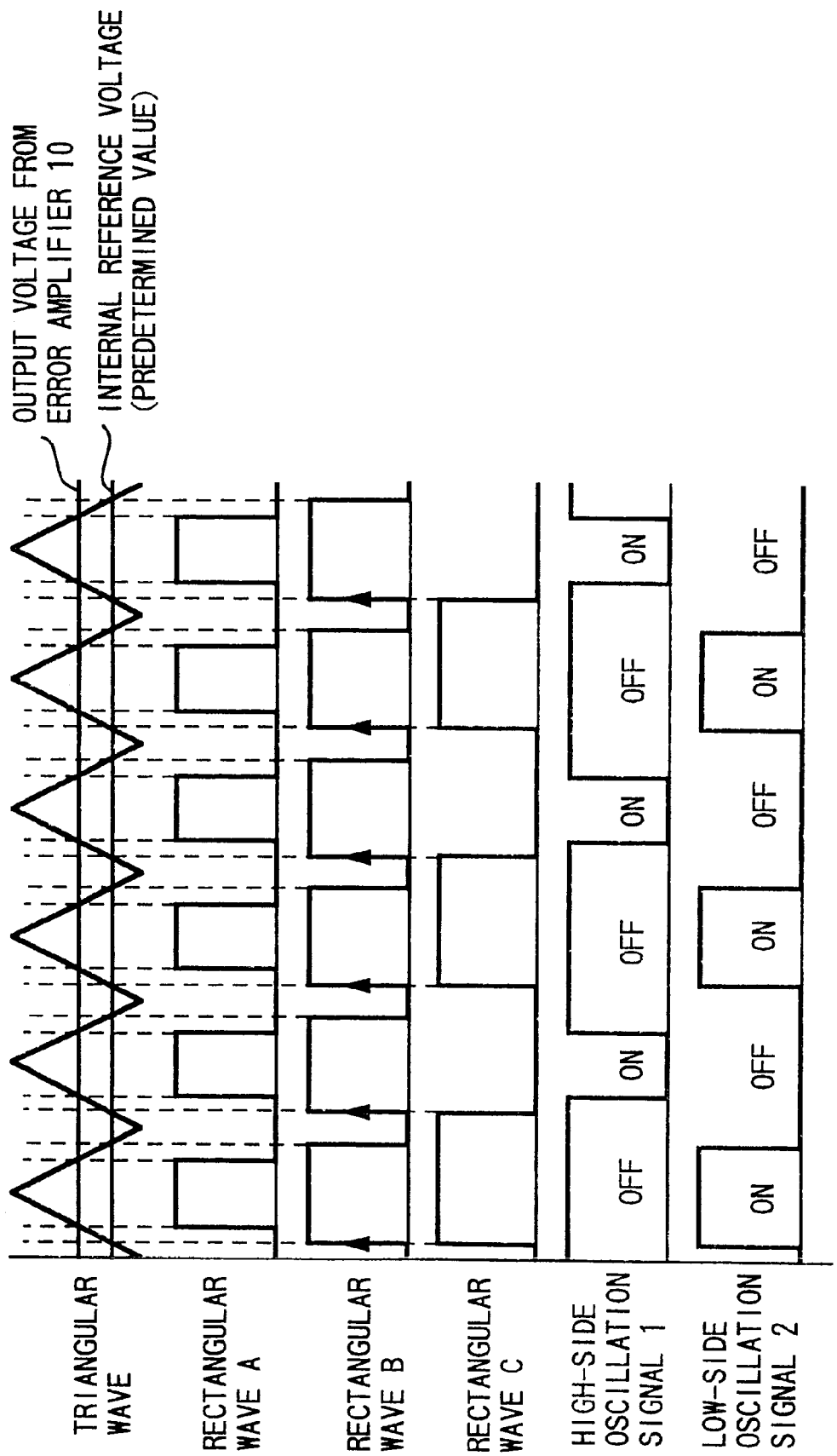
FIG. 10 is a timing chart for explaining the operation of the voltage-controlled oscillation circuit as the second embodiment of the present invention.

FIG. 10 is a timing chart for explaining the operation of the voltage-controlled oscillation circuit as the second embodiment of the present invention.

In FIG. 9, the voltage-controlled oscillation circuit 11A comprises a triangular-wave generation circuit 11a, voltage comparators 11ba and 11bb, a ½-frequency-dividing circuit 11d, and AND circuits 11e and 11f. The triangular-wave generation circuit 11a outputs a triangular wave having a frequency corresponding to an output signal from an error amplifier 5.

The voltage comparator 11ba performs so-called pulse width modulation (PWM) on the basis of the comparison result of the triangular wave output from the triangular-wave generation circuit 11a and an output voltage from an error amplifier 10, and outputs a rectangular wave A. The voltage comparator 11bb outputs a rectangular wave B on the basis of the comparison result of the triangular wave output from the triangular-wave generation circuit 11a and an internal reference voltage as a predetermined value. The ½-frequency-dividing circuit 11d reverses its output at the leading edge of the rectangular wave B output from the voltage comparator 11bb to output a rectangular wave C having a frequency ½ the frequency of the rectangular wave B. The AND circuit 11e outputs a reversed output of the AND between the rectangular wave A and the reversed output of the rectangular wave C (high-side oscillation signal 1). The AND circuit 11f outputs the AND between the rectangular waves B and C (low-side oscillation signal 2). With this circuit arrangement, the duty ratio of only high-side oscillation signal 1 can be controlled in accordance with an output voltage from the error amplifier 10.

<Modification of Second Embodiment>

Figure 11:
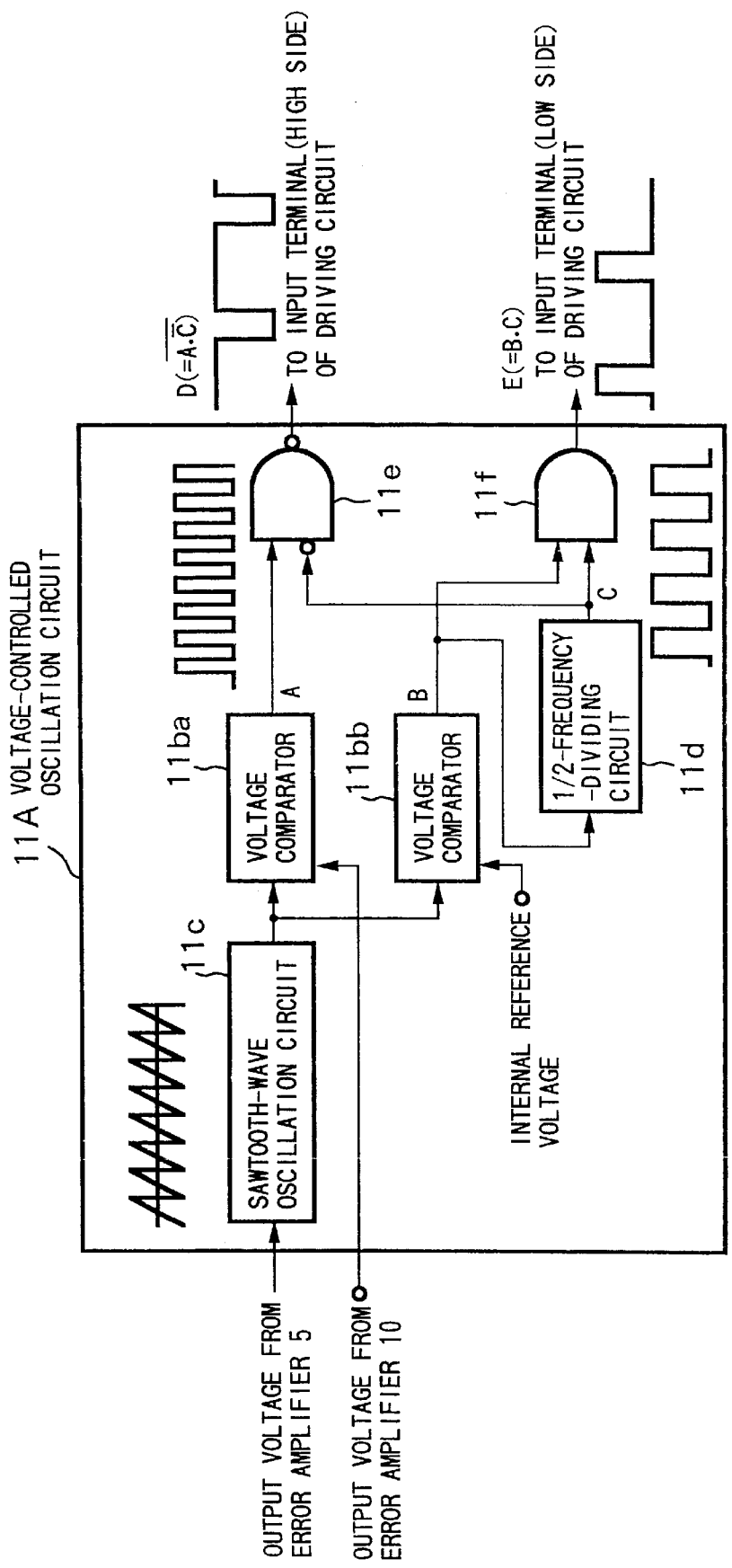
FIG. 11 is a view showing the internal arrangement of a voltage-controlled oscillation circuit as a modification of the second embodiment of the present invention.

FIG. 11 is a view showing the internal arrangement of a voltage-controlled oscillation circuit as a modification of the second embodiment of the present invention. In FIG. 11, the voltage-controlled oscillation circuit comprises a sawtooth-wave generation circuit 11c for generating a sawtooth wave, instead of the triangular-wave generation circuit 11a. The remaining arrangement and operation are substantially the same as in FIG. 9, and a description thereof will be omitted.

[Third Embodiment]

The third embodiment will exemplify the case wherein a wide-range brightness control function for a cold-cathode fluorescent lamp serving as a load 2 is added to the piezoelectric transformer control circuit described in the first embodiment.

Figure 15:
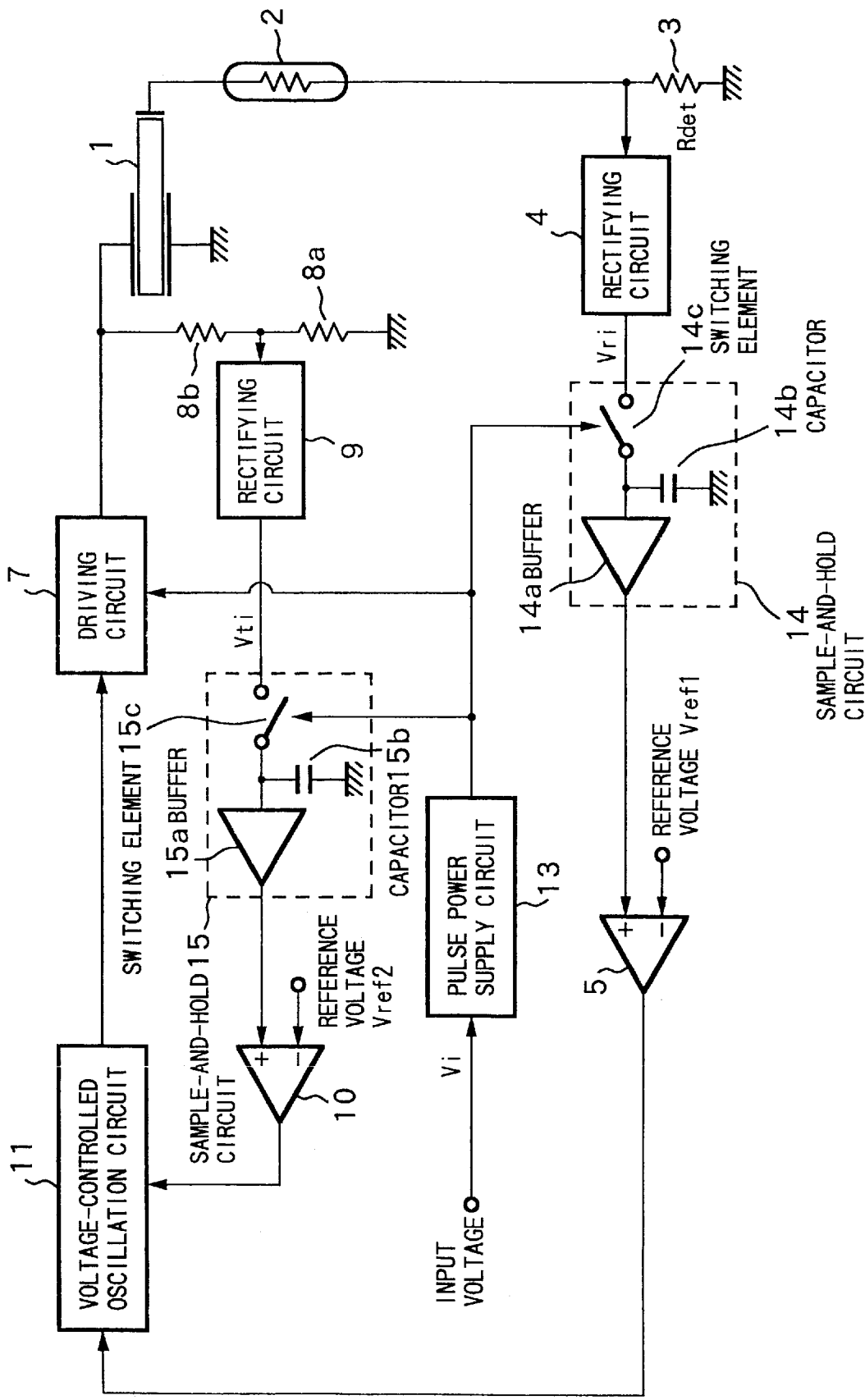
FIG. 15 is a block diagram of a piezoelectric transformer control circuit as the third embodiment of the present invention.

FIG. 15 is a block diagram of a piezoelectric transformer control circuit as the third embodiment of the present invention. The same references as in the control circuit of FIG. 4 described in the first embodiment denote the same parts in FIG. 15, and a description thereof will be omitted.

In FIG. 15, reference numeral 13 denotes a pulse power supply circuit for generating, from the input voltage Vi, a pulse-like power supply voltage (to be referred to as a pulse voltage hereinafter) to be supplied to a driving circuit 7, and controlling the pulse width or interval of the pulse voltage.

The driving circuit 7 intermittently outputs a driving voltage for driving a piezoelectric transformer from the pulse voltage of the pulse power supply circuit 13. The piezoelectric transformer 1 is driven by the intermittent driving voltage, and as a result, an intermittent high voltage is generated at the output terminal of the piezoelectric transformer 1. If the pulse width or interval of the pulse voltage to be supplied to the driving circuit 7 is changed in the pulse power supply circuit 13 at this time, the ratio of the lighting period to the non-lighting period of the cold-cathode fluorescent lamp serving as the load 2 can be changed to realize a wide-range brightness control function for the cold-cathode fluorescent lamp.

However, the luminance cannot be changed only by adding the pulse power supply circuit 13 to the control circuit in FIG. 4, and supplying the pulse voltage generated by the circuit 13 to the driving circuit 7. This is because the control circuit in FIG. 4 comprises the "function of controlling a load current to a substantially predetermined value" by the error amplifier 5 and the like, and the "function of controlling a piezoelectric transformer driving voltage to a predetermined value regardless of changes in input voltage" by the error amplifier 10 and the like, as described above. The reason will be described below.

More specifically, a problem associated with the former function will be explained. Assume that the state of the pulse voltage of the pulse power supply circuit 13 is changed to control the brightness of the cold-cathode fluorescent lamp, thereby decreasing the average lamp current (load current) of the cold-cathode fluorescent lamp by intermittent oscillation of the piezoelectric transformer 1. Since the load current detection voltage Vri becomes lower than the reference voltage Vref1 at this time, the oscillation frequency of the voltage-controlled oscillation circuit 11 shifts to a lower frequency. If the oscillation frequency shifts to a lower frequency, the driving circuit 7 operates to increase the lamp current. Consequently, the average lamp current undesirably increases to an original value.

A problem associated with the latter function will be described. When the driving circuit 7 is intermittently driven, the error amplifier 10 and the like operate as if the driving voltage to the piezoelectric transformer 1 decreases. For this reason, the function of controlling the driving voltage to a predetermined value, which is performed to hold driving of the piezoelectric transformer 1 at a high efficiency, fails to operate correctly.

To solve these problems, in the third embodiment, a sample-and-hold circuit 14 is inserted between a rectifying circuit 4 and an error amplifier 5, whereas a sample-and-hold circuit 15 is inserted between a rectifying circuit 9 and an error amplifier 10, as shown in FIG. 15. Both the sample-and-hold circuits 14 and 15 are controlled by a pulse voltage output from the pulse power supply circuit 13. As shown in FIG. 15, the sample-and-hold circuits 14 and 15 are respectively constituted by buffers 14a and 15a, charging capacitors 14b and 15b, and switching elements 14c and 15c.

The operation of the control circuit having the above arrangement will be described.

When the luminance of the cold-cathode fluorescent lamp is to be maximized, a pulse voltage to be output is adjusted to a continuous DC voltage by an adjusting means (not shown) of the pulse power supply circuit 13. At this time, the switching elements 14c and 15c are kept closed in the sample-and-hold circuits 14 and 15. This is equivalent to FIG. 4 wherein the control circuit has no sample-and-hold circuit 14 or 15.

To lower the luminance, the state of the pulse voltage to be output is adjusted from the continuous DC voltage to a pulse-like voltage (pulse voltage) by the adjusting means (not shown) of the pulse power supply circuit 13.

An operation performed when the pulse-like voltage is applied to the driving circuit 7 to intermittently drive the piezoelectric transformer 1 will be explained below.

In the ON period (to be referred to as an oscillation period hereinafter) of the pulse voltage from the pulse power supply circuit 13, the piezoelectric transformer 1 is driven by a driving voltage from the driving circuit 7, and a lamp current flows through the cold-cathode fluorescent lamp. Since the switching elements 14c and 15c receive the pulse voltage from the pulse power supply circuit 13, these elements are closed. At this time, the load current detection voltage Vri from the rectifying circuit 4 is charged in the capacitor 14b, and at the same time, output to the error amplifier 5 via the buffer 14a. Accordingly, the error amplifier 5 outputs a voltage corresponding to the difference between the load current detection voltage Vri and the reference voltage Vref1 to a voltage-controlled oscillation circuit 11. Similarly, the detection voltage Vti from the rectifying circuit 9 is charged in the capacitor 15b, and at the same time, output to the error amplifier 10 via the buffer 15a. Consequently, the error amplifier 10 outputs a voltage corresponding to the difference between the detection voltage Vti and the reference voltage Vref2 to the voltage-controlled oscillation circuit 11.

In the OFF period (to be referred to as an idle period hereinafter) of the pulse voltage from the pulse power supply circuit 13, no lamp current flows through the cold-cathode fluorescent lamp because the piezoelectric transformer 1 is not driven. At this time, the sample-and-hold circuit 14 is not influenced by the load current detection voltage Vri because the switching element 14c is opened by the pulse voltage from the pulse power supply circuit 13. The sample-and-hold circuit 14 outputs, to the error amplifier 5 via the buffer 14a, the voltage charged in the capacitor 14b while the switching element 14c is closed, i.e., the load current detection voltage Vri in the oscillation period. Similarly, the sample-and-hold circuit 15 outputs, to the error amplifier 10 via the buffer 15a, the voltage charged in the capacitor 15b while the switching element 15c is closed, i.e., the detection voltage Vti in the oscillation period.

In this way, if a voltage charged by the load current detection voltage Vri in the oscillation period is used even in the idle period, the load current can be controlled to a substantially predetermined value. In addition, if a voltage charged by the detection voltage Vti in the oscillation period is used, the driving voltage to the piezoelectric transformer can be controlled to a predetermined value even in the idle period. Therefore, the driving state of the piezoelectric transformer 1 in the oscillation period can be held.

According to the third embodiment, in the sample-and-hold circuits 14 and 15, the load current detection voltage Vri and the driving voltage (detection voltage Vti) to the piezoelectric transformer 1 are respectively sampled during the oscillation period in synchronism with the pulse voltage output from the pulse power supply circuit 13, and in the idle period, the load current detection voltage Vri and the driving voltage to the piezoelectric transformer 1 are respectively held at the voltage values during the oscillation period. As a result, the "function of holding the lamp current at a substantially predetermined value", the "function of holding the driving voltage substantially constant regardless of changes in input voltage", and the "brightness control function for the cold-cathode fluorescent lamp" can be satisfactorily realized.

Figure 16:
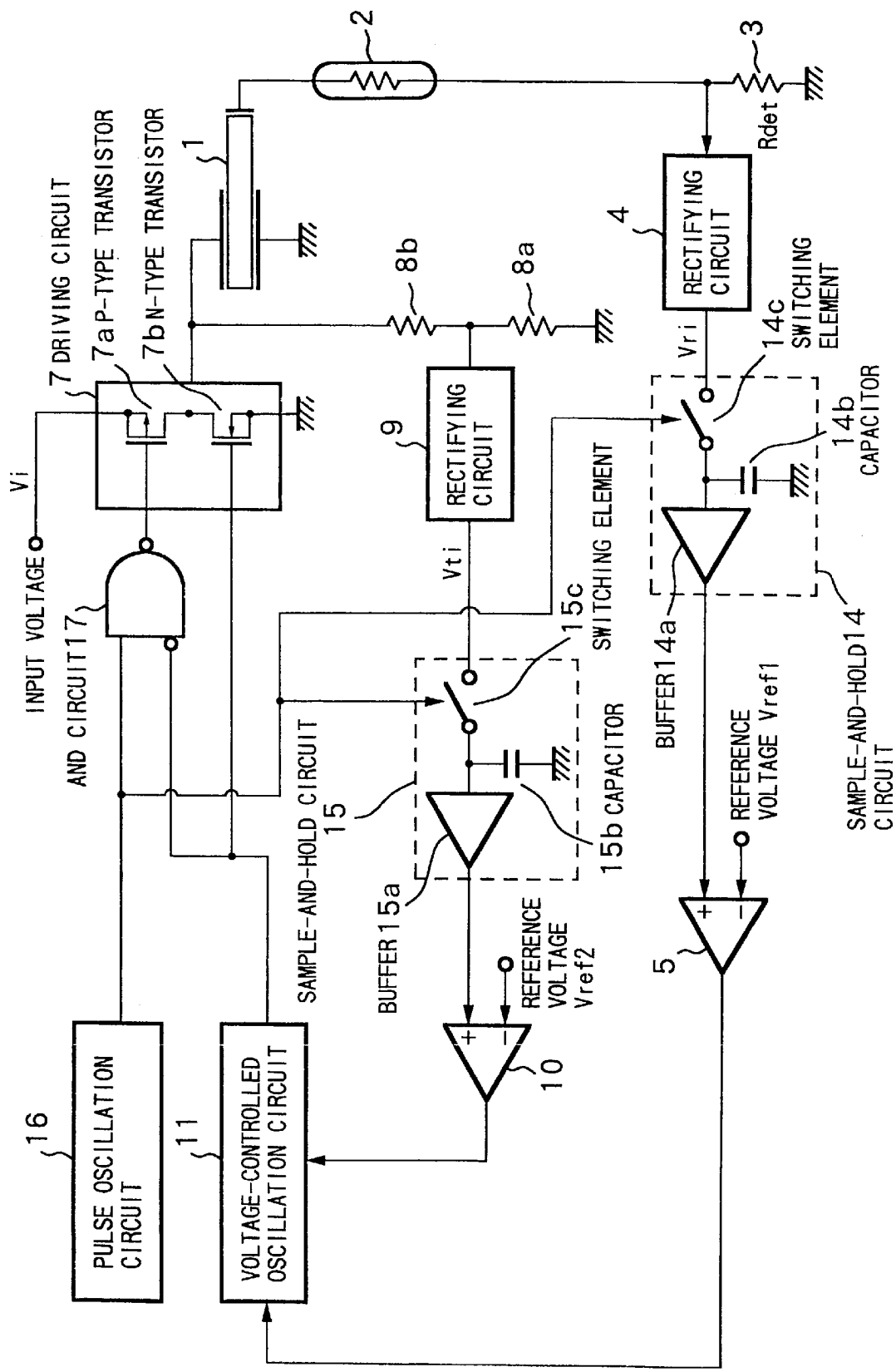
FIG. 16 is a block diagram of a piezoelectric transformer control circuit as a modification of the third embodiment of the present invention.

Although the driving circuit 7 itself is intermittently driven by the pulse power supply circuit 13 in the control circuit of FIG. 15, it can also be intermittently driven by a circuit shown in FIG. 16 when the driving circuit 7 is of a half-bridge type, as shown in FIG. 7.

FIG. 16 is a block diagram of a piezoelectric transformer control circuit as a modification of the third embodiment of the present invention. In this control circuit, a half-bridge circuit is employed as the driving circuit 7, and the input voltage Vi is directly input to this half-bridge circuit, as shown in FIG. 7. For driving control of the half-bridge circuit, a pulse oscillation circuit 16 and an AND circuit 17 are used.

More specifically, an oscillation signal from the voltage-controlled oscillation circuit 11 is input to a low-side transistor 7b of the half-bridge circuit. The AND circuit 17 generates an AND signal of the oscillation signal from the voltage-controlled oscillation circuit 11 and a pulse signal from the pulse oscillation circuit 16, and inputs the AND signal to a high-side transistor 7a of the half-bridge circuit. Since the transistor 7a performs switching in response to the AND signal, the piezoelectric transformer 1 can be intermittently driven. The sample-and-hold circuits 14 and 15 are controlled by the pulse signal from the pulse oscillation circuit 16. The remaining circuit arrangement is the same as in FIG. 15, the operations of the two sample-and-hold circuits are also the same as in FIG. 15, and a description thereof will be omitted.

The above-described functions can be realized even if the sample-and-hold circuits 14 and 15 are arranged at positions different from those in FIGS. 15 and 16.

Figure 17:
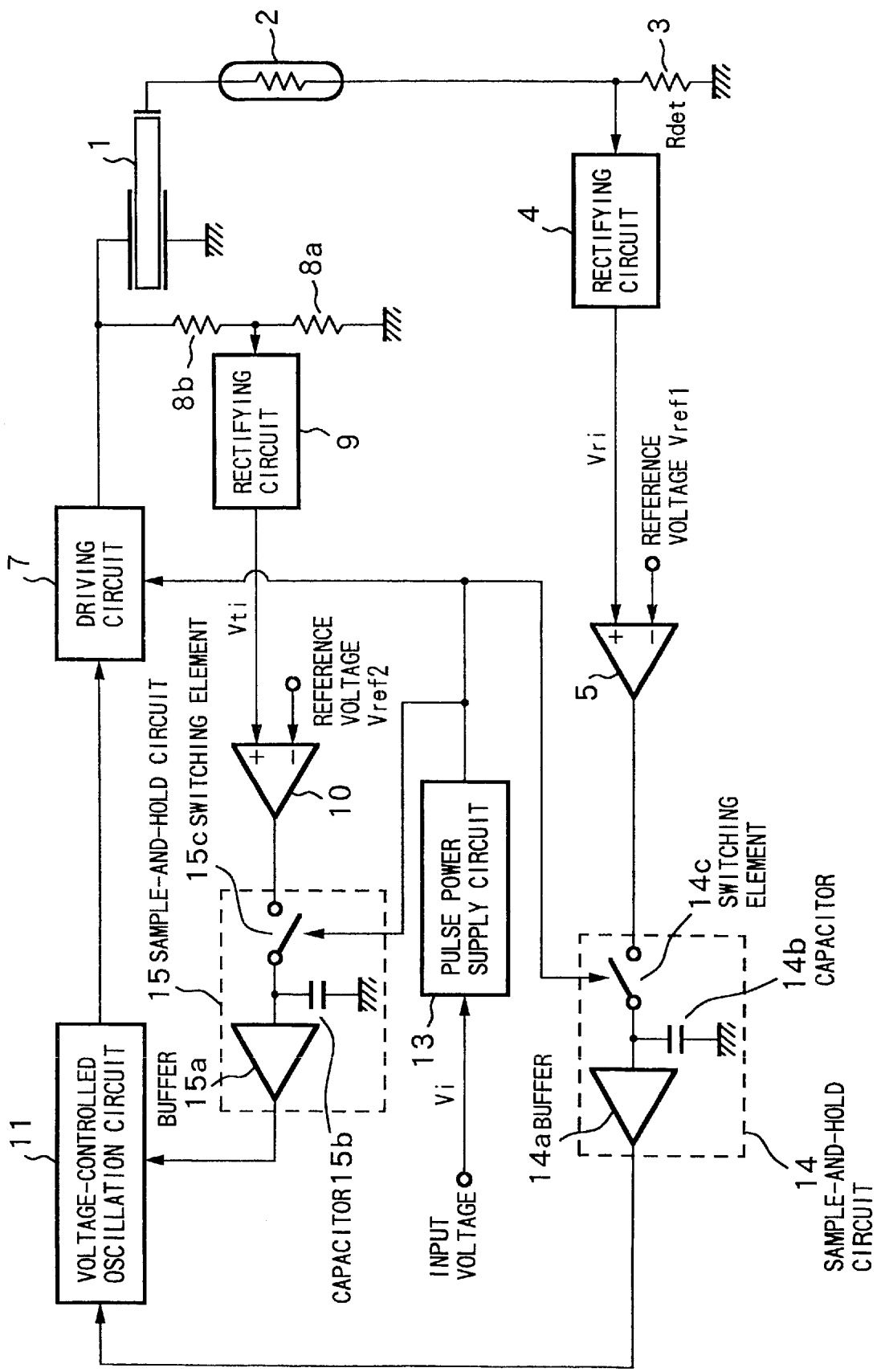
FIG. 17 is a block diagram of a piezoelectric transformer control circuit as another modification of the third embodiment of the present invention.

FIG. 17 is a block diagram of a piezoelectric transformer control circuit as another modification of the third embodiment of the present invention. In this control circuit, the sample-and-hold circuit 14 is inserted between the error amplifier 5 and the voltage-controlled oscillation circuit 11, whereas the sample-and-hold circuit 15 is inserted between the error amplifier 10 and the voltage-controlled oscillation circuit 11. A pulse voltage output from the pulse power supply circuit 13 operates the two sample-and-hold circuits, similar to the case of FIG. 15. The operations of the two sample-and-hold circuits are the same as in FIG. 15, and a description thereof will be omitted.

The circuit in FIG. 17 can also employ the half-bridge type driving circuit 7, and the pulse oscillation circuit 16 and the AND circuit 17 instead of the pulse power supply circuit 13, similar to the case of FIG. 16.

Note that the piezoelectric transformer control circuit of any of the above embodiments can be preferably used not only in driving a cold-cathode fluorescent lamp as a load but also in a display device using the cold-cathode fluorescent lamp. Also, when the piezoelectric transformer control circuit is used in a computer or a personal digital assistant (PDA) including the display device, it is naturally possible to decrease the size and weight of the apparatus.

Additionally, when an ultraviolet lamp is driven by the piezoelectric transformer control circuit of any of the above embodiments, an object can be sterilized, deodorized, or decomposed by activation by ultraviolet rays irradiated by the lamp onto the object. That is, it is possible to provide, e.g., a sterilizing device or a water purification device using the ultraviolet lamp as a sterilization lamp or a deodorizing device using the ultraviolet lamp as a light source for exciting a catalyst.

Furthermore, the piezoelectric transformer control circuit of any of the above embodiments can be used in a high-voltage generator for driving an ozone generating device or a DC-DC converter.

As has been described above, according to the embodiments, a control circuit and method for a piezoelectric transformer in which a load current can be controlled to a predetermined value regardless of changes in input voltage to drive the piezoelectric transformer at a high efficiency can be provided. That is, since a load current, and a driving voltage to the piezoelectric transformer can be respectively controlled to predetermined values even if the input voltage changes, the piezoelectric transformer can be driven at a high efficiency while preventing a shift of the oscillation frequency of the piezoelectric transformer.

As many apparently widely different embodiments of the present invention can be made without departing from the spirit and scope thereof, it is to be understood that the invention is not limited to the specific embodiments thereof except as defined in the appended claims.

What is claimed is:

1. A piezoelectric transformer control circuit for switching an input DC voltage by a driving circuit to generate an AC voltage, and driving a piezoelectric transformer by the AC voltage to obtain a high AC voltage, comprising:

a driving voltage detecting circuit for detecting a magnitude of a driving voltage to said piezoelectric transformer;

a driving voltage error output circuit for comparing an output from said driving voltage detecting circuit with a first predetermined value and for outputting a voltage error result as an amplified comparison difference;

a load current detecting circuit for detecting a magnitude of a current flowing in a load connected to said piezoelectric transformer;

a load current error output circuit for comparing an output from said load current detecting circuit with a second predetermined value and for outputting a current error result as an amplified comparison difference; and an oscillating circuit for outputting an oscillation signal for switching the input voltage, wherein the oscillation signal is a rectangular wave, and said oscillating circuit including:

a frequency adjusting circuit for adjusting a frequency of the oscillation signal in accordance with the current error result, and a duty ratio adjusting circuit for adjusting a duty ratio of the oscillation signal, which is output from said frequency adjusting circuit, in accordance with the voltage error result.

2. The circuit according to claim 1, wherein said frequency adjusting circuit is a triangular-wave oscillation circuit for outputting a triangular wave in response to the current error result, and said duty ratio adjusting circuit is a voltage comparator for comparing the triangular wave output from said triangular-wave oscillation circuit with the voltage error result to adjust the duty ratio, and for outputting the rectangular wave.

3. The circuit according to claim 1, wherein said frequency adjusting circuit is a sawtooth-wave oscillation circuit for outputting a sawtooth wave in response to the current error result, and said duty ratio adjusting circuit is a voltage comparator for comparing the sawtooth wave output from said sawtooth-wave oscillation circuit with the voltage error result to adjust the duty ratio, and for outputting the rectangular wave.

4. The circuit according to claim 3, wherein said driving circuit for driving said piezoelectric transformer is a half-bridge type driving circuit or a full-bridge type driving circuit, and said duty ratio adjusting circuit adjusts only a high-side duty ratio of said bridge.

5. The circuit according to claim 1, further comprising:

an intermittent oscillating circuit for generating a pulse signal for intermittently driving said piezoelectric transformer, and for supplying the pulse signal to said driving circuit for said piezoelectric transformer; and a first sample-and-hold circuit, located between said driving voltage detecting circuit and said driving error output circuit, for sampling and holding the output from said driving voltage detecting circuit in accordance with the pulse signal from said intermittent oscillating circuit, wherein said first sample-and-hold circuit outputting, to said driving voltage error output circuit, a held voltage corresponding to the output from said driving voltage detecting circuit during oscillation when said intermittent oscillating circuit does not oscillate.

6. The circuit according to claim 1, further comprising:

an intermittent oscillating circuit for generating a pulse signal for intermittently driving said piezoelectric transformer, and for supplying the pulse signal to said driving circuit for said piezoelectric transformer; and a first sample-and-hold circuit, located between said driving voltage error output circuit and said duty ratio adjusting circuit, for sampling and holding the voltage error result in accordance with the pulse signal from said intermittent oscillating circuit, wherein said first sample-and-hold circuit outputting, to said duty ratio adjusting circuit, a held voltage corresponding to the voltage error result during oscillation when said intermittent oscillating circuit does not oscillate.

7. The circuit according to claim 5, further comprising a second sample-and-hold circuit, located between said load current detecting circuit and said load current detecting error output circuit, for sampling and holding the current error result, wherein said second sample-and-hold circuit outputting, to said load current detecting error output circuit, a held voltage corresponding to the current error result during oscillation when said intermittent oscillating circuit does not oscillate.

8. The circuit according to claim 6, further comprising a second sample-and-hold circuit, located between said load current detecting error output circuit and said load current detecting error output circuit, for sampling and holding the current error result, wherein said second sample-and-hold circuit outputting, to said load current detecting error output circuit, a held voltage corresponding to the current error result during oscillation when said intermittent oscillating circuit does not oscillate.

9. The circuit according to claim 1, wherein said control circuit is used in a driving apparatus for a cold-cathode fluorescent lamp as said load.

10. The circuit according to claim 1, wherein said control circuit is used in a driving apparatus for an ultraviolet lamp as said load.

11. A display device, wherein a cold-cathode fluorescent lamp as a load is controlled by a piezoelectric transformer which is driven by the circuit according to claim 1.

12. A computer comprising the display device according to claim 11 as display means.

13. A personal digital assistant comprising the display device according to claim 11 as display means.

14. A deodorizing device comprising the ultraviolet lamp according to claim 10 as a light source for exciting a catalyst.

15. A sterilizing device comprising the ultraviolet lamp according to claim 10 as a sterilization lamp.

16. A water purification device comprising the ultraviolet lamp according to claim 10 as a sterilization lamp.

17. The circuit according to claim 1, wherein said control circuit is used in a high-voltage generator for an ozone generating device as said load.

18. The circuit according to claim 1, wherein said control circuit is used in a DC-DC converter.

19. A piezoelectric transformer control method of switching an input DC voltage to generate an AC voltage, and driving a piezoelectric transformer by the AC voltage to obtain a high AC voltage, comprising:

a driving voltage detection step of detecting a magnitude of a driving voltage input to said piezoelectric transformer;

a first comparison step of comparing the detected driving voltage with a first predetermined value and amplifying a first comparison result;

a load current detection step of detecting a magnitude of a current flowing in a load connected to said piezoelectric transformer;

a second comparison step of comparing the detected load current with a second predetermined value and amplifying a second comparison result; and an oscillation step of generating an oscillation signal for switching the input voltage, wherein the oscillation signal is a rectangular wave, and said oscillation step comprises the steps of:

a frequency adjustment step of adjusting a frequency of the oscillation signal in accordance with the first amplified comparison result in the first comparison step; and a duty ratio adjustment step of adjusting a duty ratio of the oscillation signal adjusted in said frequency adjustment step in accordance with the second amplified comparison result in the second comparison step.

* * * * *